United States Patent
Yamagajo et al.

(10) Patent No.: US 7,598,873 B2
(45) Date of Patent: *Oct. 6, 2009

(54) RFID TAG AND MANUFACTURING METHOD THEREOF

(75) Inventors: Takashi Yamagajo, Kawasaki (JP); Toru Maniwa, Kawasaki (JP); Manabu Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 198 days.

This patent is subject to a terminal disclaimer.

(21) Appl. No.: 11/492,941

(22) Filed: Jul. 26, 2006

(65) Prior Publication Data

US 2007/0229276 A1    Oct. 4, 2007

(30) Foreign Application Priority Data

Mar. 30, 2006 (JP) .............................. 2006-093423

(51) Int. Cl.
*G08B 13/14* (2006.01)
(52) U.S. Cl. .................................................. 340/572.7
(58) Field of Classification Search ... 340/572.1–572.8; 343/728, 748
See application file for complete search history.

(56) References Cited

U.S. PATENT DOCUMENTS

| | | | |
|---|---|---|---|
| 5,608,417 A * | 3/1997 | de Vall ....................... 343/895 |
| 6,107,920 A * | 8/2000 | Eberhardt et al. ......... 340/572.7 |
| 6,265,977 B1 * | 7/2001 | Vega et al. ................ 340/572.7 |
| 6,384,727 B1 * | 5/2002 | Diprizio et al. ........... 340/572.7 |
| 7,057,562 B2 * | 6/2006 | Forster et al. ......... 343/700 MS |
| 7,342,498 B2 * | 3/2008 | Baba et al. ................ 340/572.5 |
| 2006/0000915 A1 * | 1/2006 | Kodukula et al. ........... 235/492 |
| 2006/0032926 A1 | 2/2006 | Baba et al. |

FOREIGN PATENT DOCUMENTS

| | | |
|---|---|---|
| EP | 756 244 A2 | 1/1997 |
| EP | 1 626 364 A2 | 2/2006 |
| FR | 2 869 707 04 04593 | 11/2005 |
| JP | 2006-053833 A | 2/2006 |
| WO | 98/40930 | 9/1998 |
| WO | 2006/021914 A | 3/2006 |

* cited by examiner

*Primary Examiner*—Phung Nguyen
(74) *Attorney, Agent, or Firm*—Hanify & King, P.C.

(57) ABSTRACT

A RFID tag having a loop antenna comprises: a flat plate shaped dielectric member 51; first and second loop antenna patterns 52, 53 that are formed on a first and second surface of the dielectric member 51 so that they are separated from each other by a specified space, and so that each is continuous from the first surface to the second surface of the dielectric member 51; and an IC chip 54 that electrically connects the first and second loop antenna patterns 52, 53 on one of the surfaces.

9 Claims, 14 Drawing Sheets

(A)

(B)

CENTERLINE

| WRAPPING POSITION WITH NO SHIFTING  0mm | −3.6dBi |
|---|---|
| 0.5 mm SHIFTING | −3.7dBi |
| 1mm SHIFTING | −3.9dBi |

(A)

(B)

(A)

(B)

(C)

RFID TAG AND MANUFACTURING METHOD THEREOF

BACKGROUND OF THE INVENTION

The present invention relates to a RFID tag and manufacturing method thereof, and particularly to a RFID tag comprising a loop antenna and manufacturing method thereof, and takes advantage of characteristics as a tag antenna even when attached to a conductive body or non-conductive body.

Conventionally, in the distribution industry, the express business industry and the like, a method of printing or attaching a barcode to a product itself or to the product packaging, and reading the barcode with a barcode reader has been widely used as a method for managing individual product information. However, when reading a barcode in the related barcode processing method, the barcode had to be in contact with the barcode reader, which makes the work of reading barcodes troublesome. Also, in the prior barcode processing method, there was a problem in that it was not possible to add new information or update information to the barcode itself.

Therefore, recently there is a demand, and methods are being put into practical use of attaching a RFID (Radio Frequency Identification) tag to products in the place of a barcode and reading product information wirelessly (electromagnetic coupling) without contact. A RFID tag is a tag to which a radio information communication function has been added to an IC card function, and comprises a nonvolatile memory capable of recording information, however does not have a battery (power supply unit). Therefore, when a tag reader reads information from the RFID tag memory without contact, power is supplied to the RFID tag by electromagnetic waves, and information is read from that memory. Depending on the RFID tag, it is possible to greatly improve operability, and by using technology such as a verification function for the RFID tag, encryption and the like, it is possible to ensure excellent security.

FIG. 18 is a drawing explaining a RFID tag, where a reader 1 transmits a radio signal (electromagnetic waves) modulated by transmission data from an antenna 2 to a RFID tag 3. The antenna 3a of the RFID tag 3 inputs the received signal to a rectifier circuit 3b and a modulation and demodulating (modem) circuit 3c. The rectifier circuit 3b converts the radio signal to a direct-current voltage, and supplies the result to the modem circuit 3c and logic circuit 3d, and operates as a power supply. The modem circuit 3c demodulates control data that is transmitted from the reader 1, and inputs it to the logic circuit 3d. The logic circuit 3d performs logical processing according to that control data (command), and reads information stored in the internal memory, for example, and inputs it to the modem circuit 3c. The modem circuit 3c uses the information that was input from the logic circuit to modulate the carrier wave, and transmits the result from the antenna 3a to the reader 1.

Various types of RFID tags have been proposed. One type is a dielectric base sheet such as a plastic or paper sheet on which an antenna pattern for radio communication and IC chip (LSI) are mounted. By attaching the RFID tag to a non-conductive body, required performance for communication distance and the like is obtained. However, when the RFID tag is attached to metal such as steel, the metal impairs the communication waves of the RFID tag, and problems occur such as a decrease in communication distance.

FIG. 19 is a drawing explaining the occurrence of trouble, where (A) of FIG. 19 is a drawing explaining the case in which a RFID tag comprising a half-wave dipole antenna pattern DP is attached to a non-conductive body (not shown in the figure), and the power (open voltage V) required for the IC chip is generated in the dipole antenna DP by the radio waves emitted from a reader/writer antenna. Also, it is possible to run a current I through the dipole antenna DP and transmit electromagnetic waves toward the reader/writer antenna.

However, when a RFID tag comprising a dipole antenna DP is attached to a metal body, the tangential component of the electric field on the metal surface becomes 0 from the boundary conditions, and the surrounding electric field becomes 0. Therefore, it is not possible to supply the necessary power for the IC chip of the RFID tag. Also, it is not possible to transmit (scatter) electromagnetic waves from the tag antenna toward the reader/writer antenna. In other words, as shown in (B) of FIG. 19, when a RFID tag comprising a dipole antenna pattern DP is attached to a metal body MTL, by running a current I through the dipole antenna DP, a current image IMG is generated having current that flows in the opposite direction in the metal body MTL due to mirror image theory. This current image negates the electromagnetic field generated by the dipole antenna current I, and it is not possible to supply the necessary power to the IC chip of the RFID tag, thus it becomes impossible to transmit electromagnetic waves from the tag antenna toward the reader/writer antenna. Therefore, a RFID tag comprising a tag antenna capable of transmitting and receiving electromagnetic waves without causing a loss in antenna gain when attached to a metal surface is desired.

Therefore, as shown in (C) of FIG. 19, reducing the effect of the current image by increasing the distance D from the surface of the metal body MTL to the dipole antenna pattern DP has been considered, however, the thickness of the RFID tag increases, which poses a problem when using the tag. Also, a UHF bandwidth RFID system has the advantage of a long communication distance when compared with that of other frequency bandwidths; however, a UHF bandwidth dipole tag antenna requires normally the length of a half wave (approximately 16 cm). This length is maintained by attaching the tag antenna to a dielectric body or by bending it, and it is miniaturized, however, the bandwidth becomes narrow. From the above problems, desired is an RFID tag that comprises a tag antenna having as wide a bandwidth as possible, and whose antenna gain is not lost even when the RFID is miniaturized and made as small as possible.

Also, in order to efficiently supply the receiving power of the tag antenna to an LSI chip, it is necessary to match the impedance of the tag antenna with that of the LSI chip. In order to do that, an impedance conversion circuit is necessary, however, that increases the manufacturing cost of the RFID tag. Therefore, it is necessary to match the tag LSI chip with the tag antenna without using an impedance conversion circuit. In other words, desired is an RFID tag that comprises a tag antenna for which impedance matching is established even when an impedance conversion circuit is not used.

A prior RFID tag comprising a dipole antenna had the problem of decreased communication distance when attached to metal as described above. Therefore, various metal-compatible tag antennas have been developed for the UHF bandwidth (refer to JP2002-298106 A), however all of them were large having a thickness of 4 mm or thicker and a length of 10 cm or longer.

Therefore an RFID tag comprising a small antenna capable of transmitting and receiving electromagnetic waves even when attached to a metal surface is proposed (refer to JP2006-53833 A). As shown in FIG. 20, this proposed RFID tag 10 comprises: a rectangular-shaped dielectric member 11, an antenna pattern 12 for transmitting and receiving that is provided on the surface of the dielectric member 11 and forms a loop antenna, and an IC chip 15 that is electrically connected to the antenna pattern 12 by way of a chip-mounting pad 13.

As the rectangular-shaped dielectric member 11, it is possible to use a board made from plastic having a specified dielectric constant and containing glass and the like, or in other words, a so-called high-frequency board. The antenna pattern 12 on the flat portion of the dielectric member 11 is formed by etching a conductor (for example, a metal conductor such as copper). Also, a pair of chip-mounting pads 13 for electrically connecting the IC chip 15 to the antenna pattern 12 are formed at the same time as the antenna pattern 12 by the aforementioned etching. Furthermore, the antenna pattern 12' on the side surface portions (portions that form the thickness) of the dielectric member 11 is formed by a well known so-called side surface conduction method using plating. The IC chip 15 comprised a communication circuit for writing and reading information without contact, a memory, and a specified control circuit, as well as it comprises chip electrodes (not shown in the figure) for electrically connecting it to the chip-mounting pads 13 that extend to the antenna pattern 12. As shown in FIG. 21, the RFID tag 10 that is constructed as described above is attached to a metal body MTL using an insulating adhesive (for example double-sided tape) 16, and it is covered by a protective film or the like (not shown in the figure). This RFID tag 10 can also be constructed so that it comprises beforehand the aforementioned adhesive 16 for attaching it to the product to be used, and the protective film.

With this RFID tag having this kind of loop antenna construction, by letting a current I flow through the loop antenna, an current image IMG as shown in FIG. 22 is generated on the metal body MTL due to the same mirror image principle as shown in (B) of FIG. 19. However, in this loop antenna, only the current on the bottom of the RFID tag is negated by this current image IMG, and equivalently a current I' as shown by the dot-dash line is considered to flow, so it is possible to supply the necessary power to the LSI chip 15 of the RFID tag, and to transmit electromagnetic waves from the loop antenna toward a reader/writer antenna.

To manufacture a RFID tag with the loop antenna construction described above, first, the surfaces of the printed circuit board (dielectric member) 11, both surfaces of which are covered by a conductor, are etched to form the antenna patterns shown in FIG. 20, then plating is performed on the side surfaces, and the antenna pattern on the top surface is connected with the antenna pattern on the bottom surface by the plating 12' to form a loop antenna (loop antenna formation process). Next, the IC chip 15 is mounted in order to electrically connect the chip electrodes of the IC chip 15 to the aforementioned chip-mounting pads 13. To mount the chip, a mounting technique such as so-called flip-chip mounting can be employed.

FIG. 23 shows a different manufacturing method in which the antenna pattern 12 and chip-mounting pads 13 are printed on insulating film 20, and as shown in FIG. 24, that film is wrapped around the dielectric member 11 and fastened, then the IC chip is mounted on the chip-mounting pads 13.

According to the prior RFID tag described above having loop antenna construction, it is possible to transmit and receive electromagnetic waves even when attached to a metal surface regardless of whether the tag is small or thin, it is possible to lengthen the communication distance, it is possible to keep the gain nearly constant over a wide range, and it is possible to perform impedance matching even without an impedance conversion circuit.

However, in the first manufacturing method of the prior RFID tag, a printed circuit board is used, and a complex processes such as an etching process and side-surface plating process are necessary, so there was a problem in that the manufacturing cost increased. Also, in the second manufacturing method of the prior RFID tag, the IC chip 15 had to be mounted after wrapping insulating film around the dielectric member 11, and when wrapping and fastening the insulating film around the dielectric member, high precision is required when positioning the wrapping. In other words, the IC chip is very small, for example 0.4 mm square, so in order to mount it properly, high precision, for example positioning precision of 10 to several 100 μm is necessary when wrapping the insulating film around the dielectric member 11.

SUMMARY OF THE INVENTION

The object of the present invention is to provide a RFID tag having a loop antenna that does not require a high amount of precision in the positioning of a film on which an IC chip is mounted when wrapping it around a dielectric material, and to the manufacturing method thereof.

Another object of the present invention is to provide a small, thin RFID tag that is capable of supplying necessary power even when attached to metal, is capable of transmitting and receiving electromagnetic waves, is capable of widening the bandwidth and does not require an impedance conversion circuit.

Yet another object of the present invention is to provide a small, thin RFID tag that is capable of supplying necessary power even when attached to a non-conductive body, is capable of transmitting and receiving electromagnetic waves, is capable of widening the bandwidth and does not require an impedance conversion circuit.

The RFID tag having a loop antenna of a first form of the invention comprises: a flat plate shaped dielectric member; first and second loop antenna patterns that are formed on a first and second surface of the dielectric member so that they are separated from each other by a specified space, and so that each is continuous from the first surface to the second surface of the dielectric member; and an IC chip that electrically connects the first and second loop antenna patterns on one of the surfaces. The first and second loop antenna patterns comprise IC chip-mounting sections on which the IC chip is mounted, and the IC chip-mounting sections are formed on the dielectric member so that they face each other and are separated from each other by a specified space.

The RFID tag having a loop antenna of a second form of the invention comprises: a flat plate shaped dielectric member; an insulating film on which first and second band-shaped loop antennas comprising IC chip-mounting sections are formed so that the IC chip-mounting sections face each other and are separated from each other by a specified space; and an IC chip that is mounted on the IC chip-mounting sections and is electrically connected to the first and second loop antennas; wherein the insulating film on which the IC chip is mounted is wrapped around the dielectric member so that the IC chip is located on a first surface of the dielectric member, and the first and second loop antenna patterns are located on a second surface of the dielectric member so that they are separated from each other by a specified space.

The RFID tag having a loop antenna of a third form of the invention comprises: a flat plate shaped dielectric member; first and second loop antenna patterns that are formed on a first and second surface of the dielectric member so that they are separated from each other by a specified space, and so that each is continuous from the first surface to the second surface of the dielectric member; an IC chip that electrically connects the first and second loop antenna patterns on one of the surfaces; and an insulating layer and conductive layer that are layered on the surface opposite from the IC chip-mounting surface. The first and second loop antenna patterns comprise IC chip-mounting sections on which the IC chip is mounted, and the IC chip-mounting sections are formed on the dielectric member so that they face each other and are separated from each other by a specified space.

The RFID tag having a loop antenna of a fourth form of the invention comprises: a flat plate shaped dielectric member; an insulating film on which first and second band-shaped loop antennas comprising IC chip-mounting sections are formed so that the IC chip-mounting sections face each other and are separated from each other by a specified space; an IC chip that is mounted on the IC chip-mounting sections and is electrically connected to the first and second loop antennas; and an insulating layer and conductive layer that are layered on the surface opposite from the IC chip mounting surface; wherein the insulating film on which the IC chip is mounted is wrapped around the dielectric member so that the IC chip is located on a first surface of the dielectric member, and the first and second loop antenna patterns are located on a second surface of the dielectric member so that they are separated from each other by a specified space.

The manufacturing method of the RFID tag having a loop antenna of the first form of the invention comprises: a step of forming first and second band-shaped loop antenna patterns that comprise IC chip-mounting sections on an insulating film so that the IC chip-mounting sections face each other and are separated from each other by a specified space; a step of mounting an IC chip on the IC chip-mounting sections of the first and second loop antenna patterns, and electrically connecting the IC chip to the first and second loop antenna patterns; and a step of wrapping and fastening the insulating film on which the IC chip is mounted around a flat plate shaped dielectric member so that the IC chip is located on a first surface of the dielectric member, and the first and second loop antenna patterns are located on a second surface of the dielectric member so that they are separated from each other by a specified space.

The manufacturing method of the RFID tag having a loop antenna of the second form of the invention comprises: a step of forming first and second band-shaped loop patterns that comprise IC chip-mounting sections on an insulating film so that the IC chip-mounting sections face each other and are separated from each other by a specified space; a step of mounting an IC chip on the IC chip-mounting sections of the first and second loop antenna patterns, and electrically connecting the IC chip to the first and second loop antenna patterns; a step of wrapping and fastening the insulating film on which the IC chip is mounted around a flat plate shaped dielectric member so that the IC chip is located on a first surface of the dielectric member, and the first and second loop antenna patterns are located on a second surface of the dielectric member so that they are separated from each other by a specified space; and a step of layering an insulating layer and conductive layer on the surface opposite from the IC chip mounting surface.

According to this invention it is possible to provide a RFID tag having a loop antenna that does not require a high amount of precision in the positioning of a film on which an IC chip is mounted when wrapping it around a dielectric material, and to provide the manufacturing method thereof.

Moreover, according to this invention since loop antenna construction is used, it is possible to provide a small, thin RFID tag that is capable of supplying necessary power even when attached to metal, is capable of transmitting and receiving electromagnetic waves, is capable of widening the bandwidth and does not require an impedance conversion circuit.

Furthermore, according to this invention since loop antenna construction is used and an insulating layer and conductive layer are layered on the surface opposite from the IC chip mounting surface, it is possible to provide a small, thin RFID tag that is capable of supplying necessary power even when attached to a non-conductive body, is capable of transmitting and receiving electromagnetic waves, is capable of widening the bandwidth and does not require an impedance conversion circuit.

DESCRIPTION OF THE PREFERRED EMBODIMENTS

(A) First Embodiment

Construction

Figure 1:
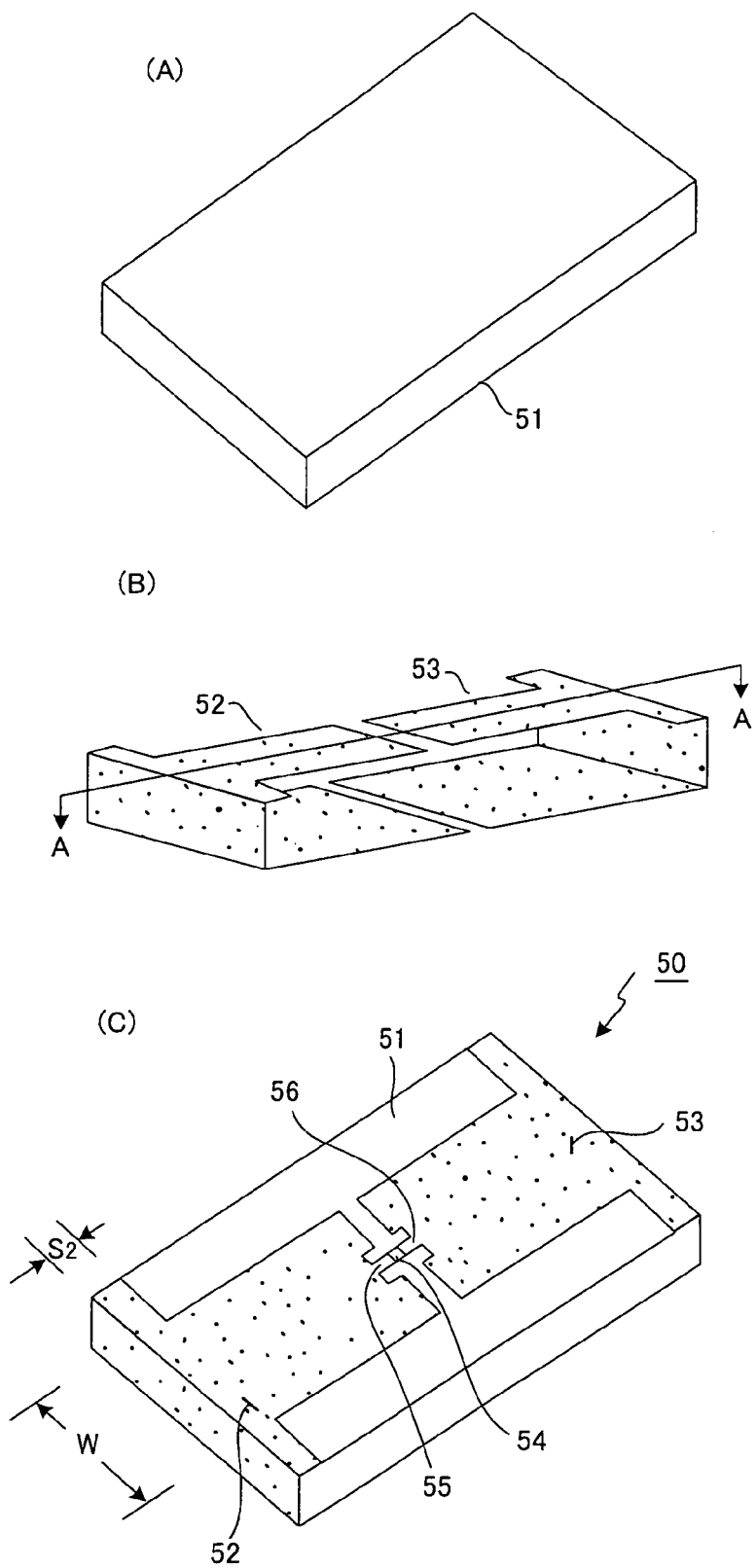
FIG. 1 is an perspective drawing of details of a RFID tag having the loop antenna construction of the present invention.

FIG. 1 is a perspective drawing of details of a RFID tag 50 having the loop antenna construction of this invention. As shown in (A)-(C) of FIG. 1, first and second loop antenna sections 52, 53 having a U-shaped cross section AA are attached to a 78×45×1.2 mm flat plate-shaped dielectric member (dielectric board) 51. Also, a LSI chip 54 is mounted on chip-mounting pads 55, 56 so that it fits in a concave section (not shown in the figure) formed in the dielectric board 51 and so that it is connected to the antenna sections 52, 53. The chip-mounting pads 55, 56 are located on the end sections of the loop antenna sections 52, 53.

The dielectric board 51, for example has electrical characteristics of a dielectric constant ∈r=4.3 and dielectric loss factor tan δ=0.009, and can be formed using just inexpensive resin that does not contain glass or the like. For example, this dielectric board 51 can be formed using a resin having good formability and mechanical properties such as polytetrafluoroethylene (PTFE), polyphenylether (PPE).

Figure 2:
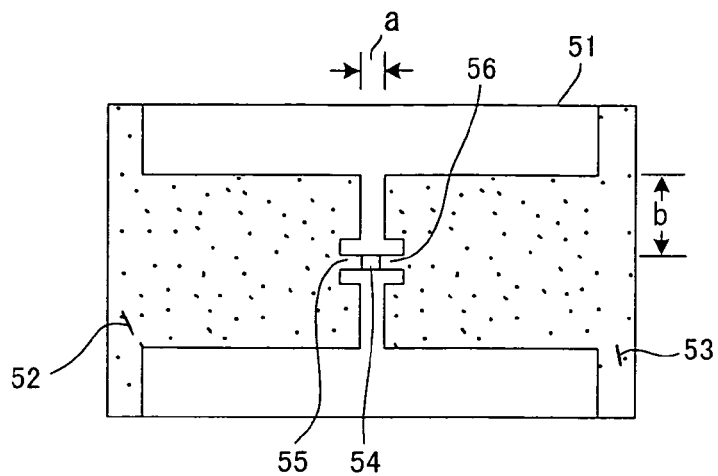
FIG. 2 is a top view of the RFID tag of a first embodiment.
Figure 3:
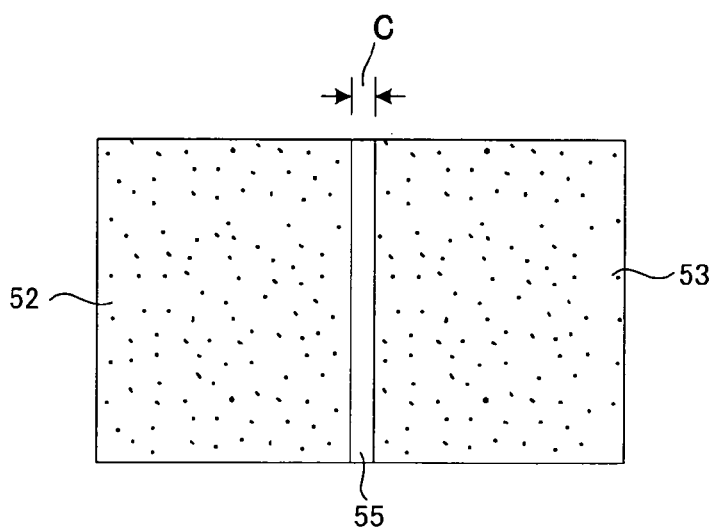
FIG. 3 is a bottom view of the RFID tag of a first embodiment.

FIG. 2 is a top view of the RFID tag of a first embodiment of the invention, and FIG. 3 is a bottom view. As can be seen from the bottom view of FIG. 3, the first and second loop antenna sections 52, 53 of the RFID tag of this invention are non conducting on the opposite side from the LSI chip, and dielectric surface slit 55 having a width of c mm (=about 3 mm) is exposed.

Figure 4:
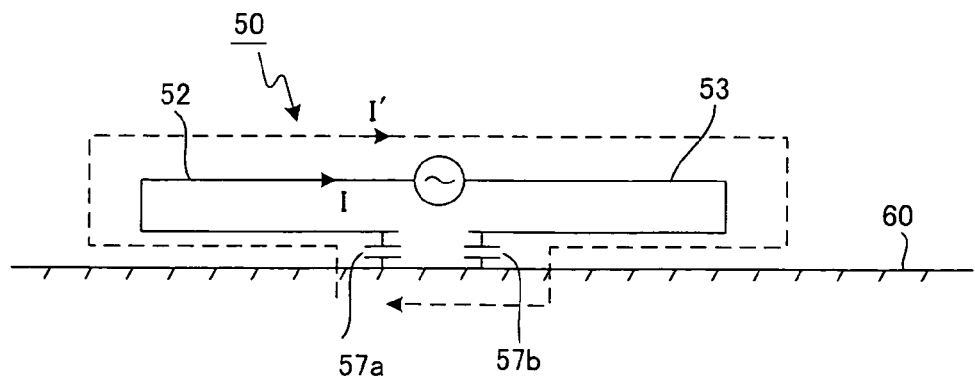
FIG. 4 is a drawing of an equivalent antenna circuit when the RFID tag of the invention is attached to a conductive body by way of an insulating layer (not shown in the figure).
Figure 22:
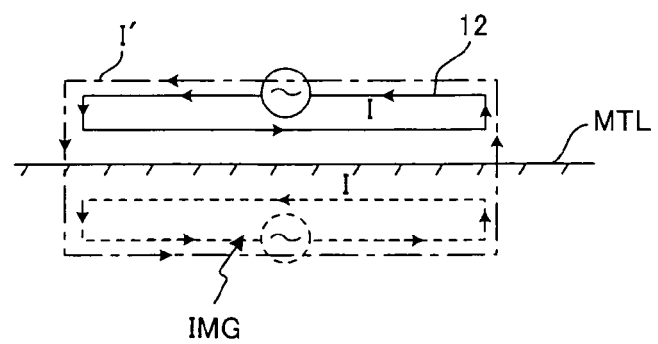
FIG. 22 is a drawing for explaining the reasons why it is possible to supply the necessary power to the LSI chip and transmit electromagnetic waves even when the RFID tag of FIG. 20 is attached to a metal body.
Figure 23:
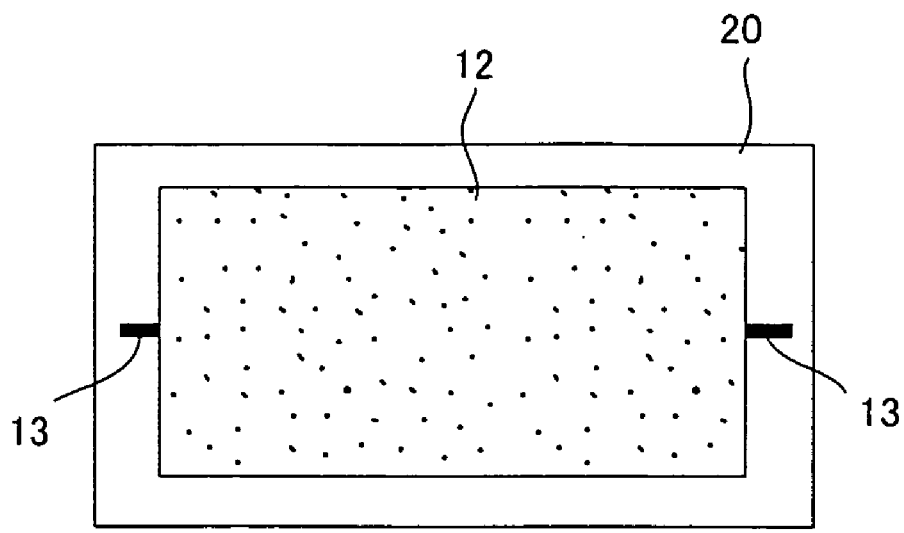
FIG. 23 is a first drawing for explaining the method for manufacturing the RFID tag of FIG. 20.

FIG. 4 is a drawing showing an equivalent antenna circuit for the case in which the RFID tag 50 of this invention is attached to an electric body 60 by way of an insulating layer or insulating sheet (not shown in the figure). The loop antenna sections 52, 53 are capacitively coupled with the electric body 60 by way of electrostatic capacitance 57a, 57b of the insulating layer to form a current loop. As a result, according to the same principle explained using FIG. 22, a current I' is considered to flow equivalently in the loop antenna as shown by the dashed line, making it possible to supply the necessary power to the LSI chip of the RFID tag, and thus it is possible to transmit electromagnetic waves from the loop antenna toward a reader/writer antenna.

Manufacturing Method

Figure 5:
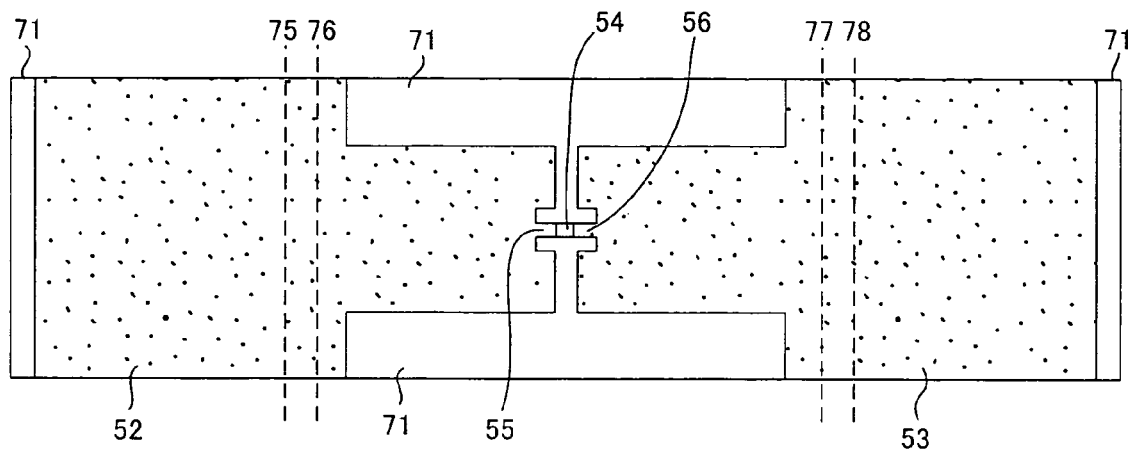
FIG. 5 is a drawing explaining the manufacturing method of the RFID tag of the present invention.

FIG. 5 is a drawing for explaining the method for manufacturing the RFID tag of this invention.

Using a printing technique, the first and second loop antenna sections (loop antenna) 52, 53 are printed on thin insulating film 71 so that they face each other. In other words, the loop antenna sections 52, 53 are formed by printing conductive paste on the insulating film 71 using screen printing. At the same time, a pair of chip-mounting pads 55, 56 are formed on the end sections of the loop antenna sections 52, 53 for mounting a LSI chip and electrically connecting it to the loop antenna sections 52, 53.

As the insulating film 71, it is possible to use flexible thermoplastic resin such as polyethylene terephthalate (PET), polyimide (PI), polyethylene naphthalate (PEN), polyvinyl chloride (PVC) or the like, however, taking into consideration workability, insulating characteristics, mechanical strength, and cost, PET is most preferred. The size of the insulating film 71 should be just enough to wrap around the dielectric body 51 so that it is possible to form the loop antenna sections 52, 53 as shown in (C) of FIG. 1.

Next, the LSI chip 54 is mounted on the chip-mounting pads 55, 56 that are formed on the end sections of the first and second loop antenna sections 52, 53 using a mounting technique such as chip bonding.

After that, the insulating film 71 on which the LSI chip 54 is mounted is bent along bending sections 75 to 78 that correspond to the corner sections of the dielectric board 51, and wrapped around and fastened to the dielectric board 51. Fastening the insulating film 71 to the dielectric board 51 can be performed using adhesive, double-sided tape or the like.

To summarize, the manufacturing method for the RFID tag of a first embodiment comprises:

(1) a first step of forming band-shaped first and second loop antenna patterns 52, 53 having IC chip-mounting sections 55, 56 on an insulating film 71 so that the IC chip-mounting sections face each other;

(2) a second step of mounting an IC chip 54 on the IC chip-mounting sections of the first and second loop antenna patterns, and electrically connecting it to the first and second loop antenna patterns; and (3) a third step of wrapping and fastening the insulating film 71 on which the IC chip 54 is mounted around the flat shaped dielectric body 51 (see FIG. 1) so that the IC chip is located on a first surface of the dielectric body, and the first and second loop antenna patterns are located on a second surface so that they are separated from each other by a specified space.

In order that the RFID tag antenna that is manufactured as described above has the required characteristics, a 3-dimensional electromagnetic field simulator ACCUFIELD made by Fujitsu was used to perform dimensional design of all of the antenna parts. By adjusting dimensions such as s2 (see FIG. 1), it is possible to optimize the antenna impedance, frequency band and gain.

Characteristics of the RFID Tag of the First Embodiment (a) Impedance Matching

Figure 6:
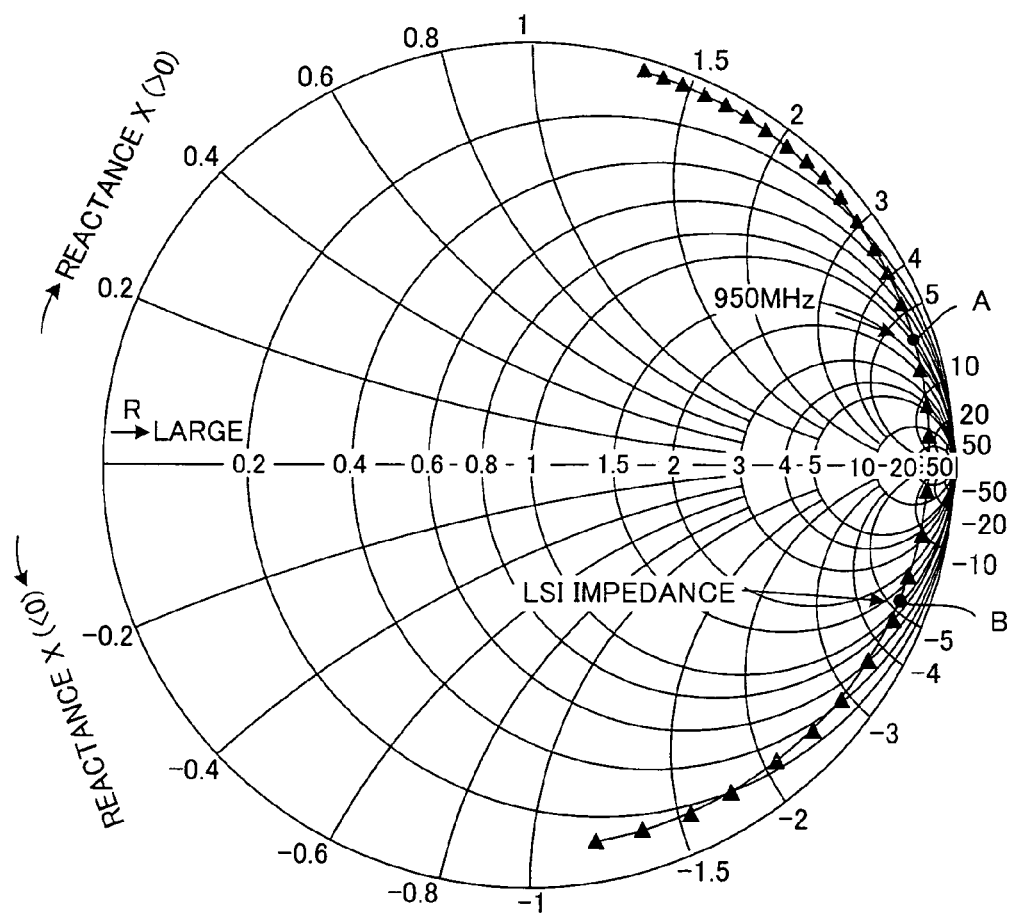
FIG. 6 is a plot of the tag antenna impedance plotted on a Smith chart.

A dielectric material having a dielectric constant of ∈r=4.3, and loss factor tan δ=0.009 was employed as the dielectric board 51 shown in FIG. 1. Also, loop antenna patterns, each having dimensions w=25 mm, S2=5 mm (see (C) of FIG. 1), a=3 mm, b=10 mm (FIG. 2) and c=3 mm (FIG. 3), were wrapped around the dielectric board 51, having a size 78×45×1.2 mm, to form the RFID tag, and the impedance of the tag antenna was simulated over a range from 800 MHz to 1.1 GHz. FIG. 6 is a plot of the impedance of the tag antenna plotted on a Smith chart, and the impedance of the loop antenna at 950 MHz is shown at point A. The loop antenna impedance at 950 MHz becomes a value that nearly matches the input impedance of the LSI chip 54 (see (B) of FIG. 6).

Figure 7:
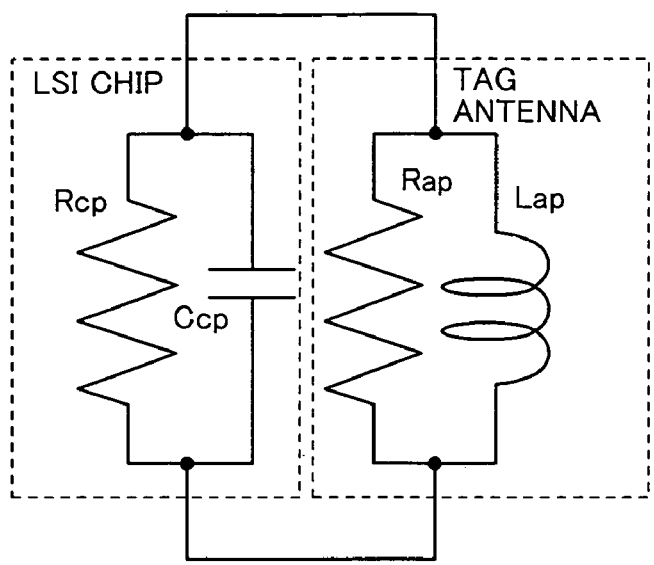
FIG. 7 is a drawing of a RFID tag equivalent circuit.

An equivalent circuit of the RFID tag constructed with an LSI chip and tag antenna is as shown in FIG. 7. In other words, the equivalent circuit is expressed as a parallel circuit of the LSI chip and tag antenna, where the LSI chip is expressed as a parallel circuit of a resistor Rcp and capacitor Ccp, and the tag antenna is expressed as a parallel circuit of a resistor Rap and impedance Lap. The matching conditions of this RFID tag are RcP=Rap, ωL=1/ωC, and from FIG. 6, the RFID tag of this first embodiment satisfies the matching conditions.

(b) Gain Characteristics

Figure 8:
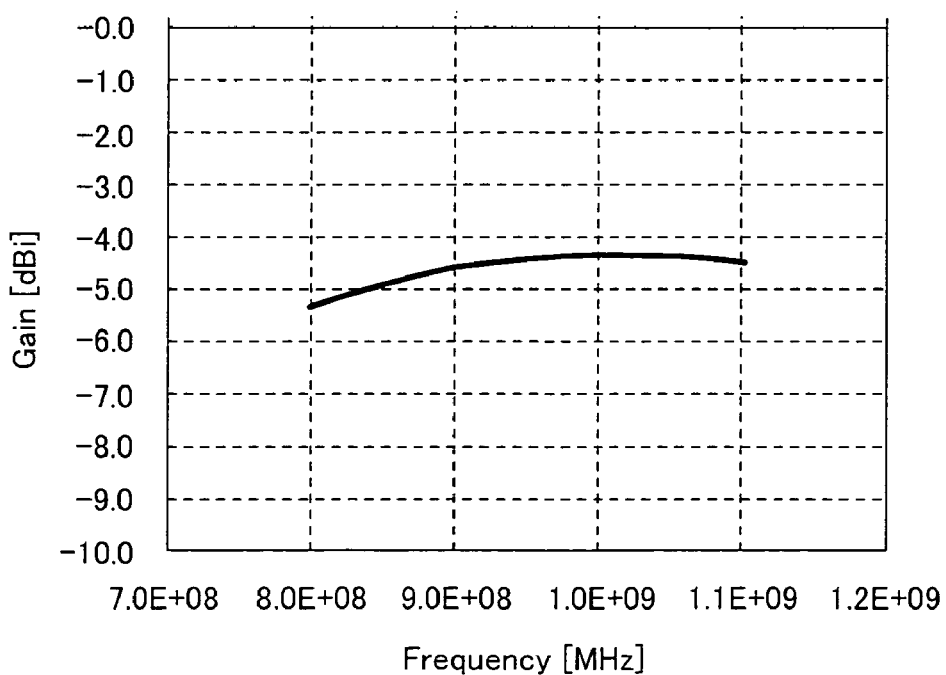
FIG. 8 is a drawing showing the antenna gain characteristics when the frequency is changed between 800 MHz to 1.1 GHz (1100 MHz).

FIG. 8 is a drawing showing the antenna gain characteristics when the frequency is changed between 800 MHz to 1.1 GHz (1100 MHz), and it can be seen that the gain is nearly constant over a wide range (=−5 dB to −4.3 dB), and wide bandwidth characteristics are obtained. In FIG. 8, E+08 means $10^{+8}$ and E+09 means $10^{+9}$ respectively.

Figure 9:
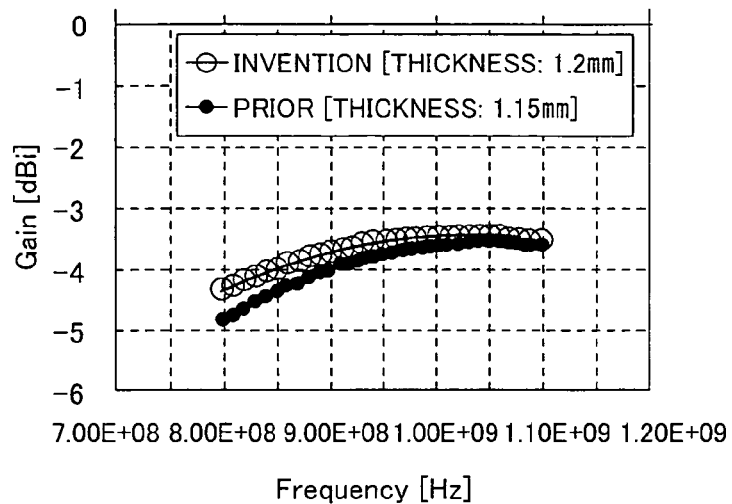
FIG. 9 is a drawing showing the antenna gain characteristics of a prior RFID tag together with the antenna gain characteristics of the first embodiment for comparison.
Figure 10:
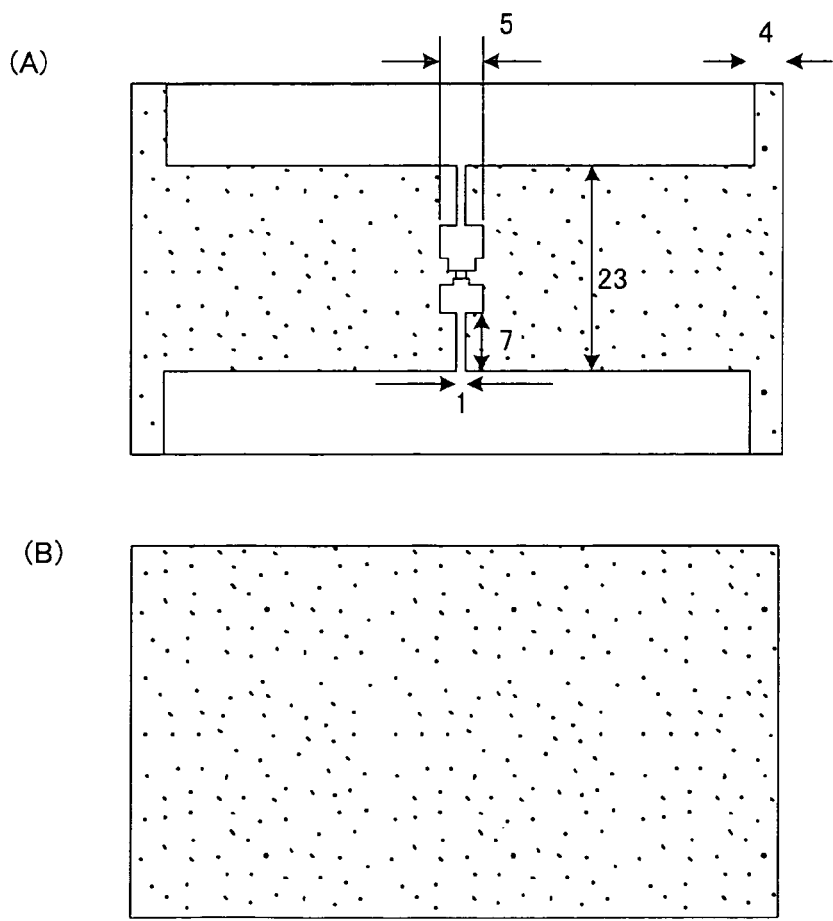
FIG. 10 is a top view and bottom view of a prior RFID tag.
Figure 24:
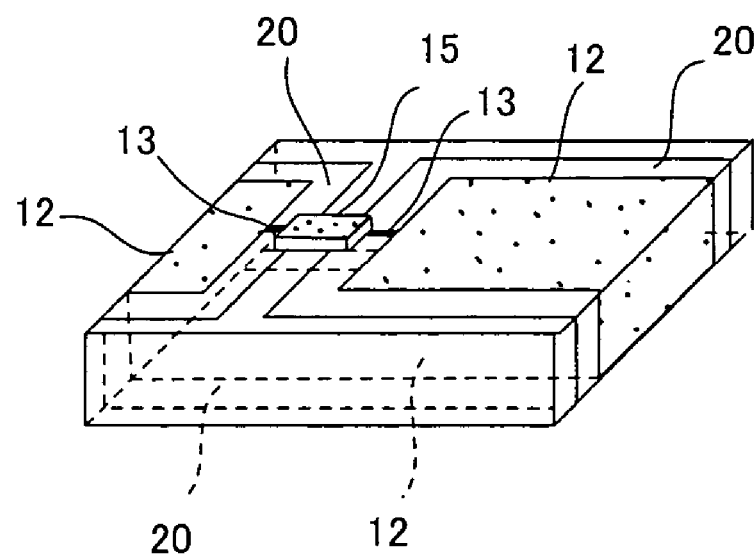
FIG. 24 is a second drawing for explaining the method for manufacturing the RFID tag of FIG. 20.

FIG. 9 is a drawing showing the antenna gain characteristics of the prior RFID tag shown in FIG. 24, and the antenna gain characteristics of the first embodiment are shown for comparison. This prior tag antenna comprises a dielectric board having a size of 78×45×1.15 mm, that is created using a dielectric material having a dielectric constant of ∈r=4.1, and loss factor tan δ=0.009 and loop antenna patterns having the dimension shown in (A) and (B) of FIG. 10 formed on both surfaces of the dielectric board. From FIG. 9 it is seen that the tag antenna of the first embodiment has the same antenna gain characteristics as the prior tag antenna. The gain of the tag antenna of this first embodiment is a little high, however, the reason for this is thought to be due to the difference in the board thickness.

(c) Various Characteristics of the Antenna Pattern Dimension s2

Figure 11:
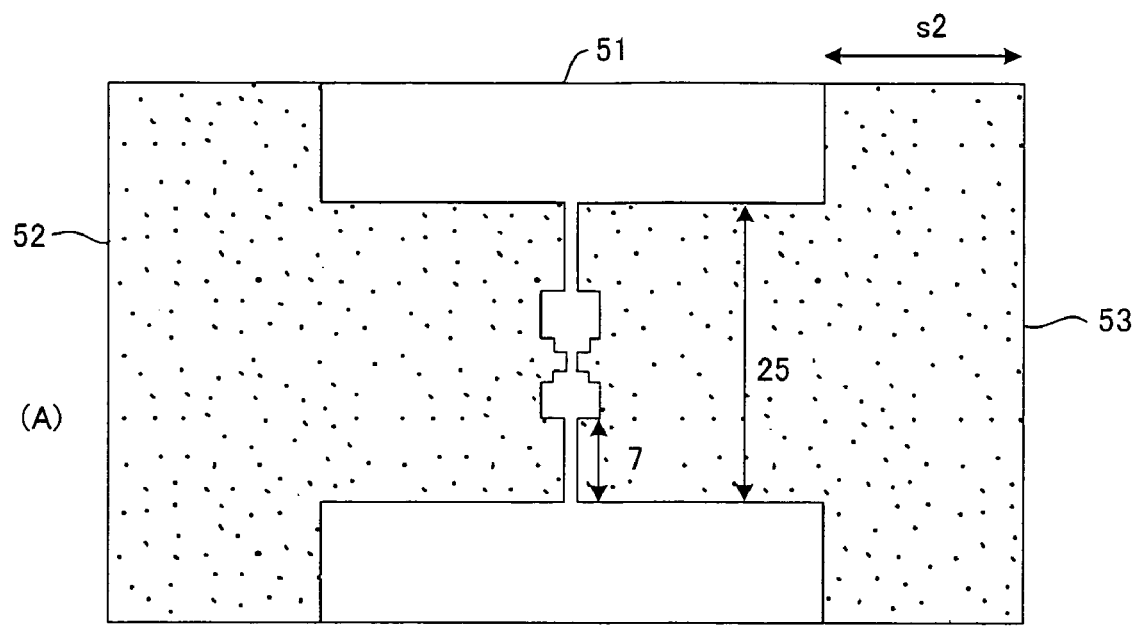
FIG. 11 is a drawing for explaining the antenna pattern of this invention.
Figure 11:
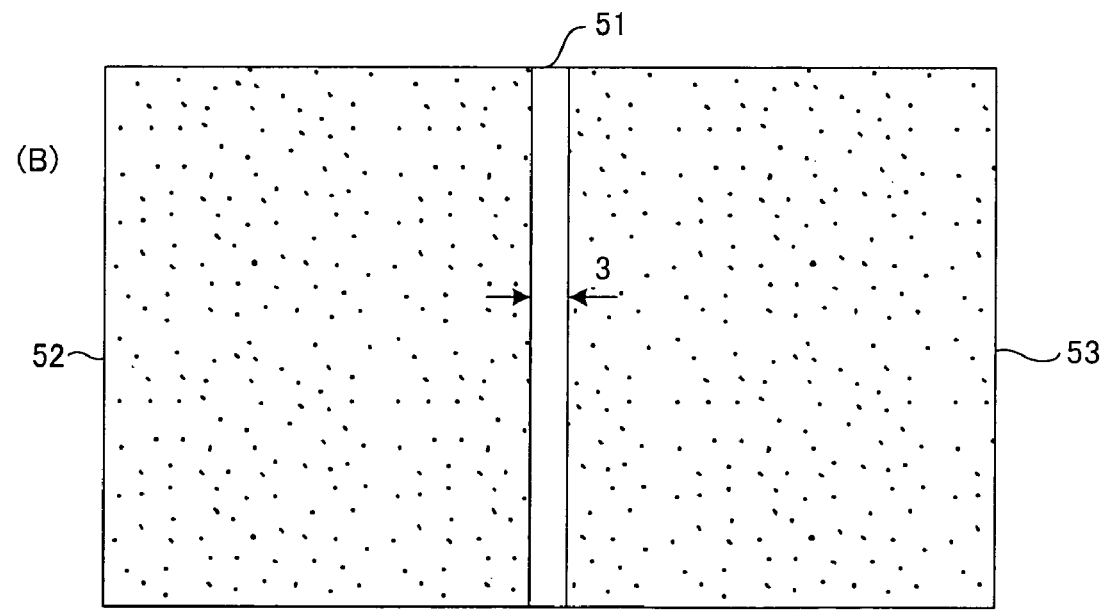

A dielectric board 51 having a size 78×45×1.2 mm was created using a dielectric material having a dielectric constant of ∈r=5.0, and loss factor tan δ=0.002, and a tag pattern was formed on both sides of the dielectric board, the tag pattern comprising loop antennas 52, 53 having the dimensions shown in (A) and (B) of FIG. 11. Also, the pattern dimension s2 is variable from the top end section, and the antenna gain, tag antenna resistance Rap, LSI chip capacitance Ccp were simulated for s2=10 mm to 20 mm. The gain characteristics are shown in (A) of FIG. 12, the chip capacitance characteristics are shown in (B) of FIG. 12 and the antenna resistance characteristics are shown in (C) of FIG. 12.

Figure 12:
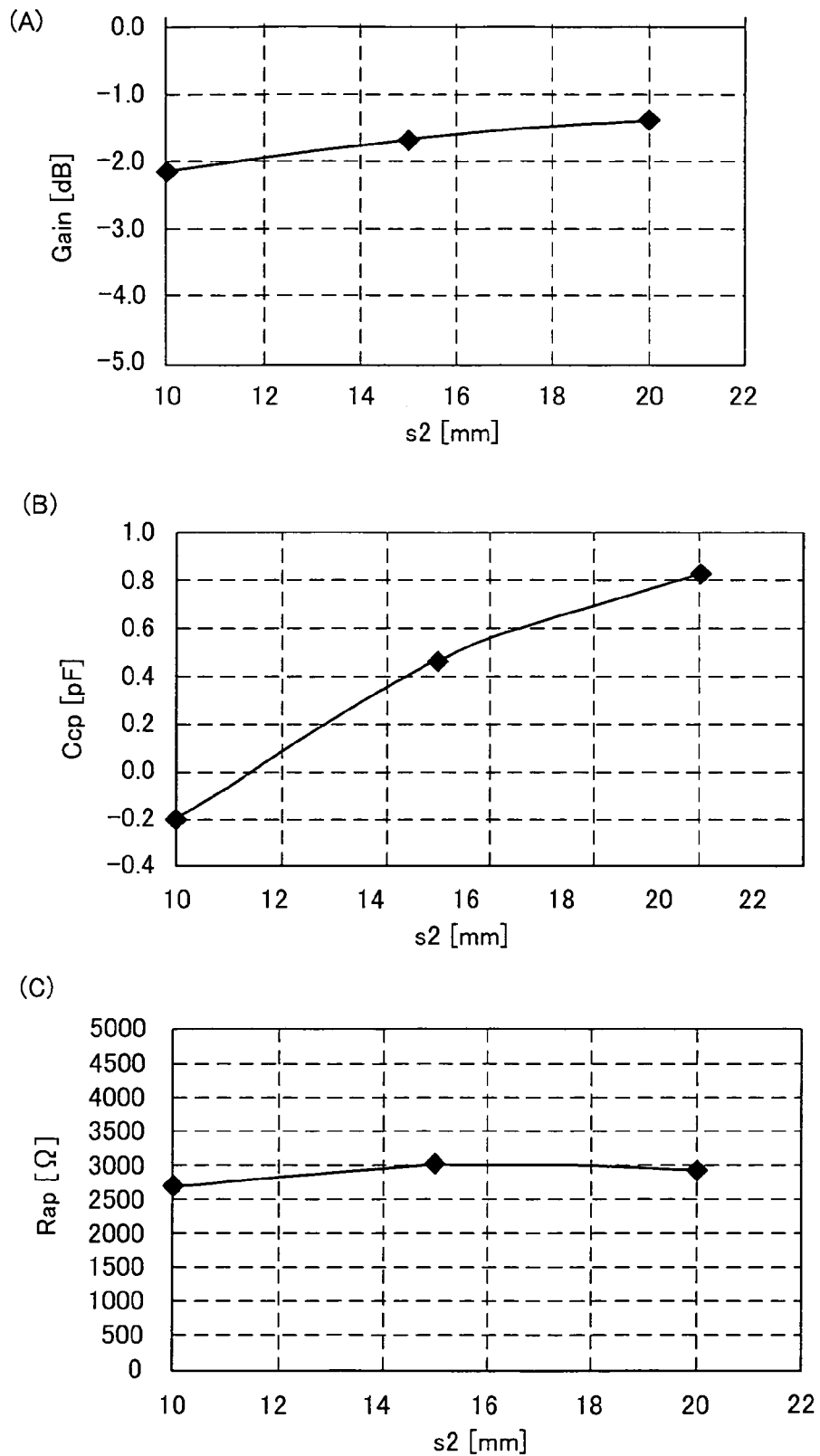
FIG. 12 is a drawing showing the gain characteristics, chip capacity characteristics and tag antenna resistance characteristics of this invention when s2 is changed.

From (A) of FIG. 12 it is seen that even though the dimension s2 changes, the gain and the antenna resistance Rap are nearly constant, and only the chip capacitance Ccp changes. From this, it can be seen that when the impedance of the tag antenna and the LSI chip are not matched, it is possible to match the impedance of the tag antenna and LSI chip by adjusting the dimension s2.

The RFID communication distance r is given by the equation below.

$$R = \lambda/(4\pi)(PtGtGr\tau/Pth)^{0.5}$$

Here, λ is the wavelength, Pt is the power supplied to the reader/writer antenna, Gt and Gr are the antenna gain of the tag antenna and reader/writer antenna, respectively, and Pth is the minimum value of the power required for the IC chip to operate. Also, τ expresses the degree of matching of the IC chip and tag antenna, and is given by the following equation.

$$\tau = 4RcRt/(Zc+Za)^2$$

Here, Rc is the real part of the IC chip impedance, Rt is the real part of the tag antenna impedance, Zc and Za are the complex impedance of the IC chip and tag antenna, respectively. Based on the simulation results shown in FIG. 12, it is seen that the calculated RFID tag communication distance shown in FIG. 11 becomes 1.7 m, and a very practical communication distance can be obtained. Here, Gr was taken to be 9 dBi, Pt was taken to be 0.5 W and Pth was taken to be −5 dBm. Also, the IC chip impedance was taken to be 72−258 jΩ.

The tag antenna of this invention is about the same size as a business card and the thickness is about 1.2 mm, which puts it in the extremely small and thin category as a UHF bandwidth metal compatible tag.

Also, according to the RFID tag of this first embodiment, the position of the wrapping does not require high precision.

Figures 13, 14:
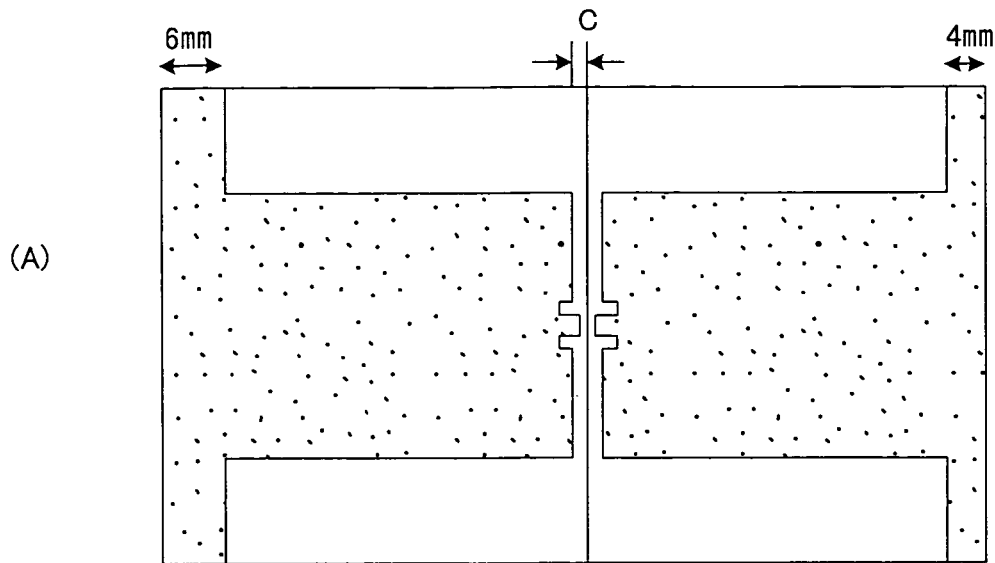
FIG. 13 is a drawing for explaining the RFID tag effect of a first embodiment.
FIG. 14 is a drawing showing the correspondence between wrapping error and change in gain.

FIG. 13 (A), (B) are a top view and a bottom view of the RFID tag of the first embodiment in the case where precision of the wrapping position is shifted by 1 mm, and FIG. 14 is a drawing showing the antenna gain when the wrapping error from the center line C-C is 0.05 mm and 1 mm. It can be seen that even when the wrapping error is 1 mm, the gain does not greatly change, and is only 0.3 dB at the most, and the communication distance is decreased by just a few %, which causes no large effect. From this, according to the RFID tag of this invention, by mounting the IC chip before wrapping, it is possible to relax the position precision of the wrapping broadly compared with the prior art.

This embodiment was explained for a rectangular dielectric board, however, the present invention is not limited to this shape, and the dielectric board could be any flat 3-dimensional shape such as triangular, square, hexagonal or the like.

According to the RFID tag of this first embodiment, together with being able to supply the necessary power even when attached to metal, it is possible to transmit electromagnetic waves, and it is possible to widen the bandwidth, thus it is possible to provide a small, thin RFID tag that does not require an impedance conversion circuit. Moreover, according to the RFID tag of this first embodiment, by wrapping the insulating film around the dielectric material before mounting the IC chip, high precision in positioning the wrapping is not necessary.

(B) Second Embodiment

The RFID tag of the first embodiment is attached to a conductive body by way of an insulating layer and used, so an equivalent circuit as shown in FIG. 4 is formed and the required characteristics are obtained. However, in the case of attaching the RFID tag to a non-conductive body, current does not flow through the antenna pattern, so it does not function as a tag antenna.

Figure 15:
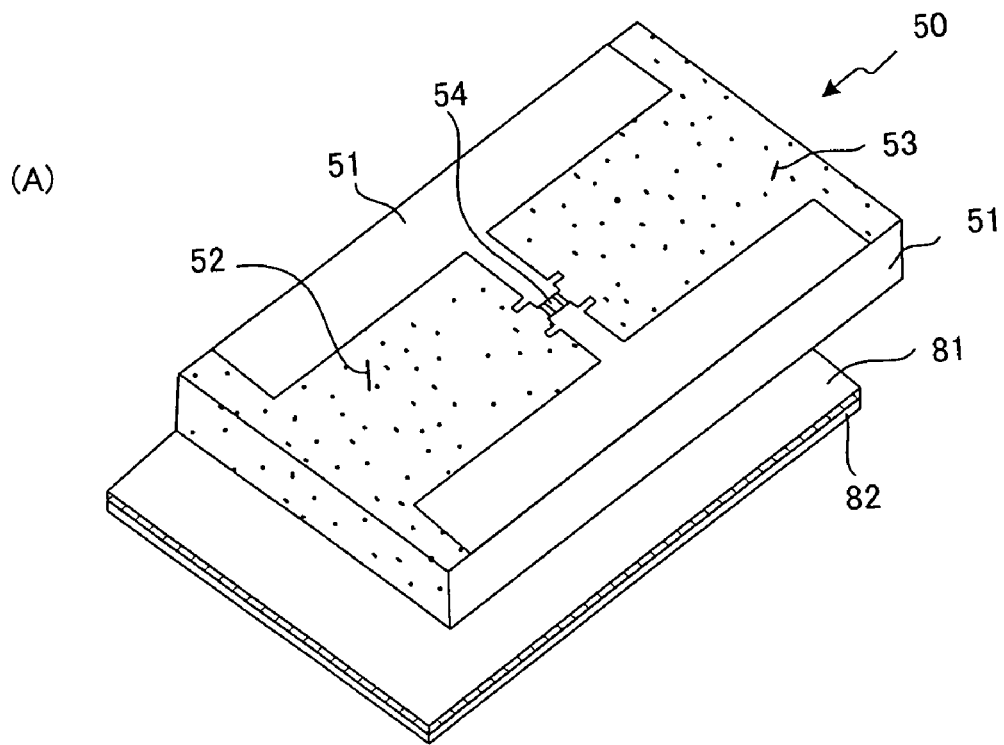
FIG. 15 is a drawing for explaining a RFID tag having the loop antenna construction of a second embodiment.
Figure 15:
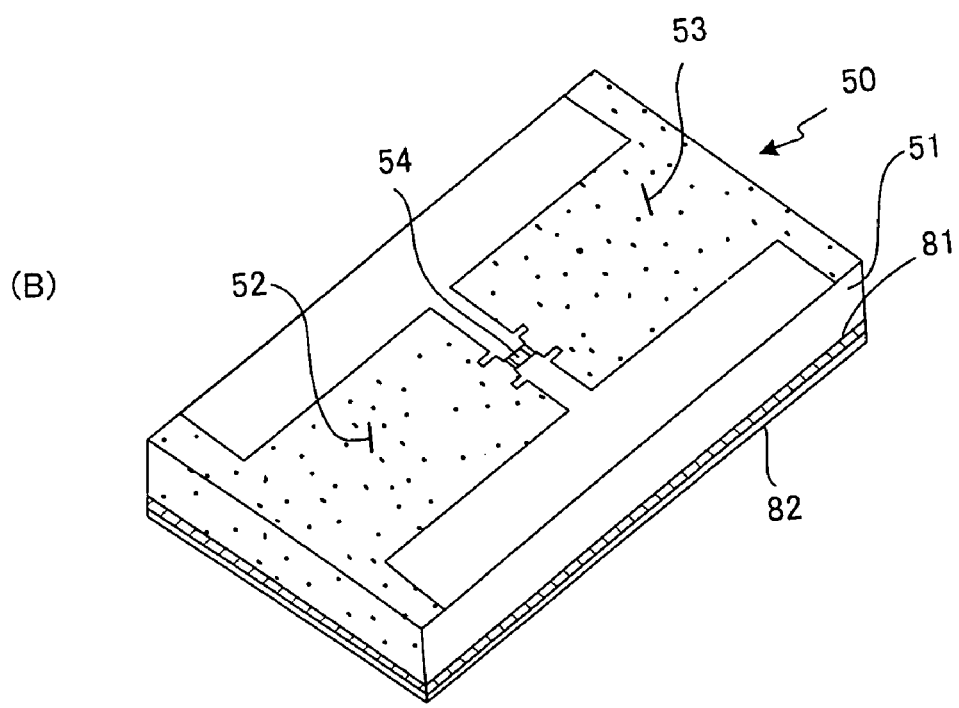

FIG. 15 is a drawing explaining the RFID tag having the loop antenna construction of a second embodiment of the invention in which current can flow through the antenna pattern when the RFID tag is attached to a non-conductive body, where (A) of FIG. 15 is an perspective view of details of the RFID tag, and (B) of FIG. 15 is a perspective view of the RFID tag.

The RFID tag of this second embodiment is constructed with a 100 μm insulating sheet 81 and conductive sheet 82 layered on the bottom surface of the RFID tag 50 (see (C) of FIG. 1) of the first embodiment. By using this construction, the RFID tag of this second embodiment forms the equivalent circuit as shown in FIG. 4 when attached to a non-conductive body and power is supplied to the tag antenna, and the required characteristics are obtained.

The RFID tag of the second embodiment can be manufactured by layering an insulating sheet 81 and conductive sheet 82 on the RFID tag of the first embodiment. In other words, the method for manufacturing the RFID tag of this second embodiment comprises:

(1) a first step of forming band-shaped first and second loop antenna patterns having IC chip-mounting sections on an insulating film so that the IC chip-mounting sections face each other;

(2) a second step of mounting an IC chip on the IC chip-mounting sections of the first and second loop antenna patterns, and electrically connecting it to the first and second loop antenna patterns;

(3) a third step of wrapping and fastening the insulating film on which the IC chip is mounted around the flat shaped dielectric body so that the IC chip is located on a first surface of the dielectric body, and the first and second loop antenna patterns are located on a second surface so that the are separated from each other by a specified space; and (4) a step of layering an insulating layer and conductive layer on the IC chip-mounting surface and opposite surface.

Figure 16:
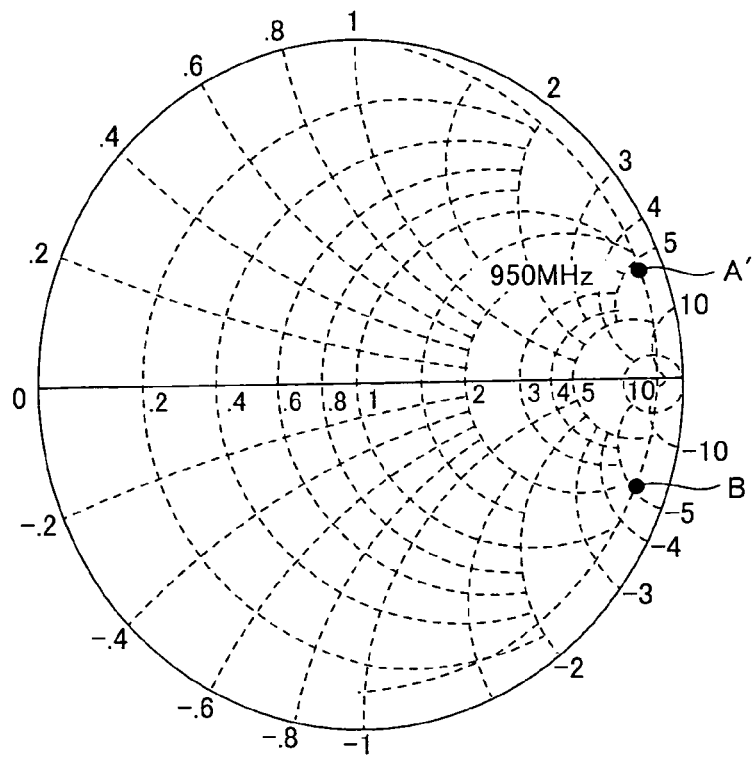
FIG. 16 is a plot of the impedance of the tag antenna of a second embodiment plotted on Smith chart.
Figure 17:
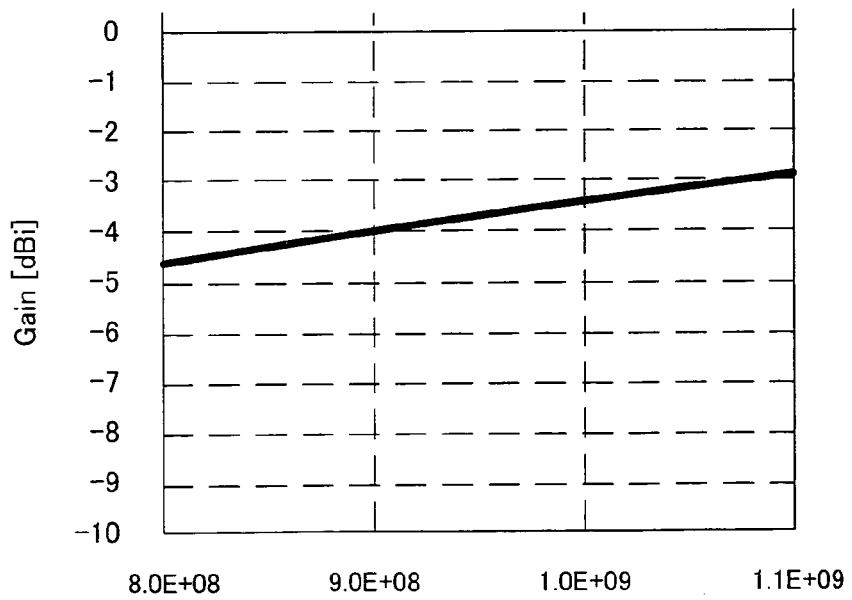
FIG. 17 is a drawing showing the antenna gain characteristics of a second embodiment when the frequency is changed between 800 MHz to 1.1 GHz (1100 MHz).
Figure 18:
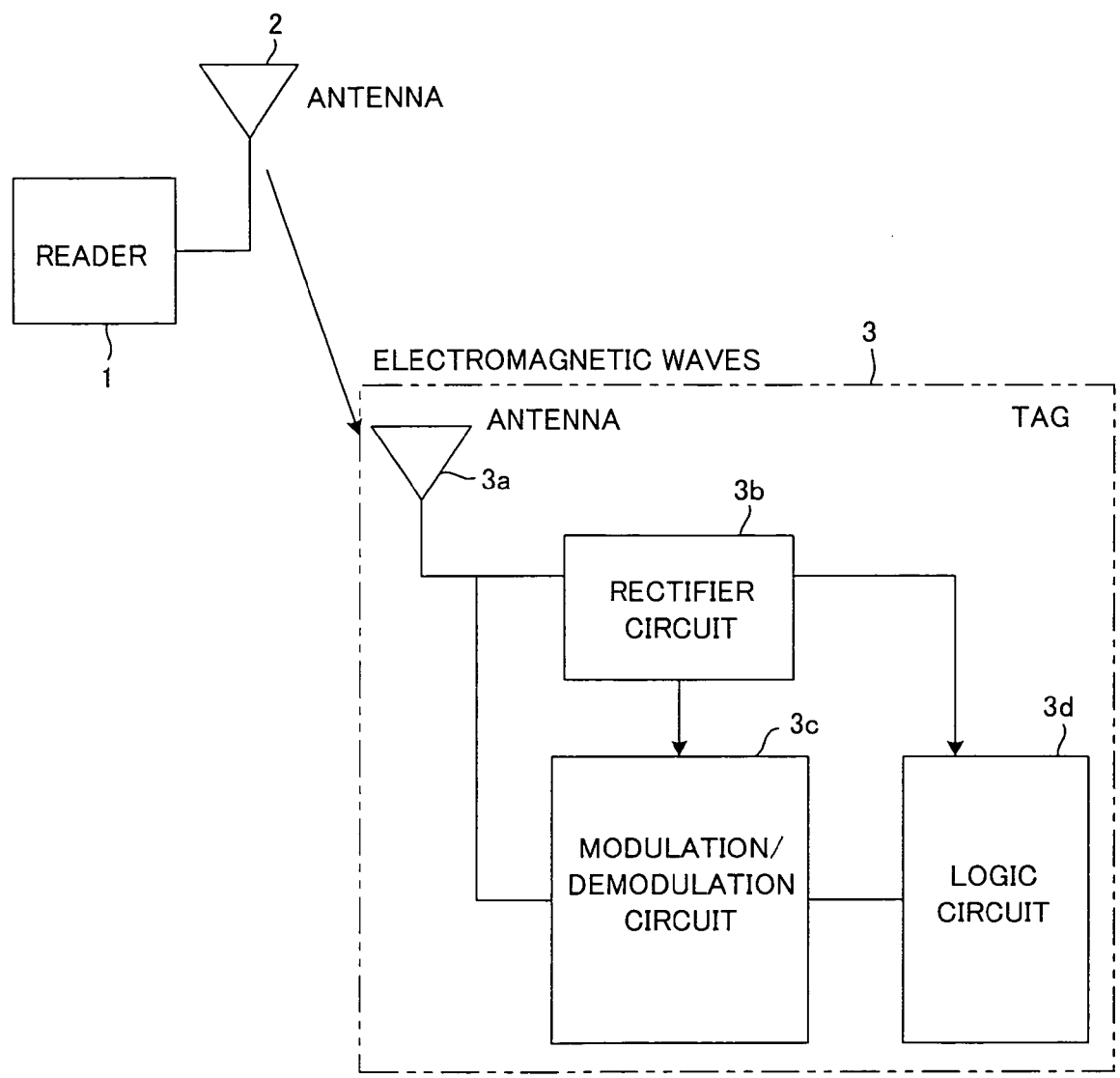
FIG. 18 is a drawing for explaining the RFID tag.
Figure 19:
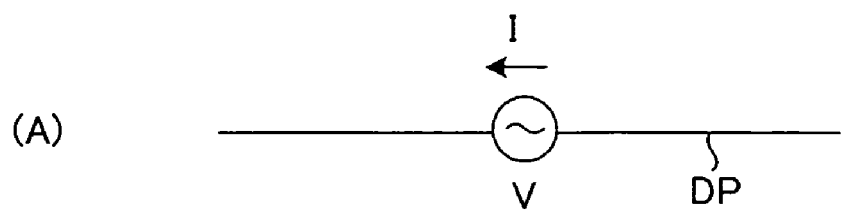
FIG. 19 is a drawing for explaining the problems with a prior RFID tag.
Figure 19:
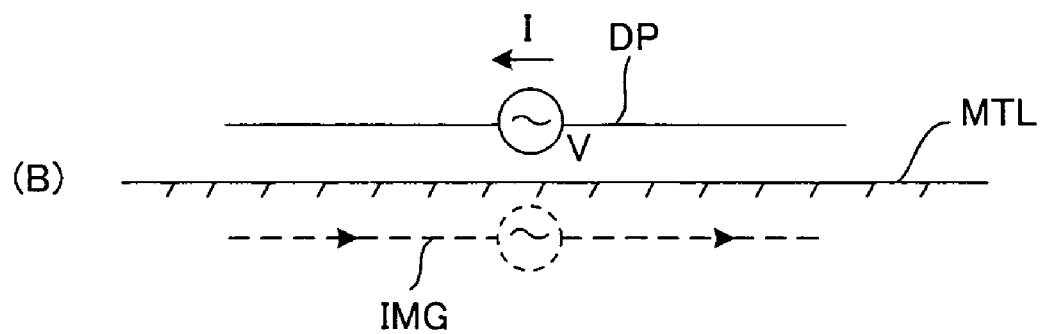
Figure 19:
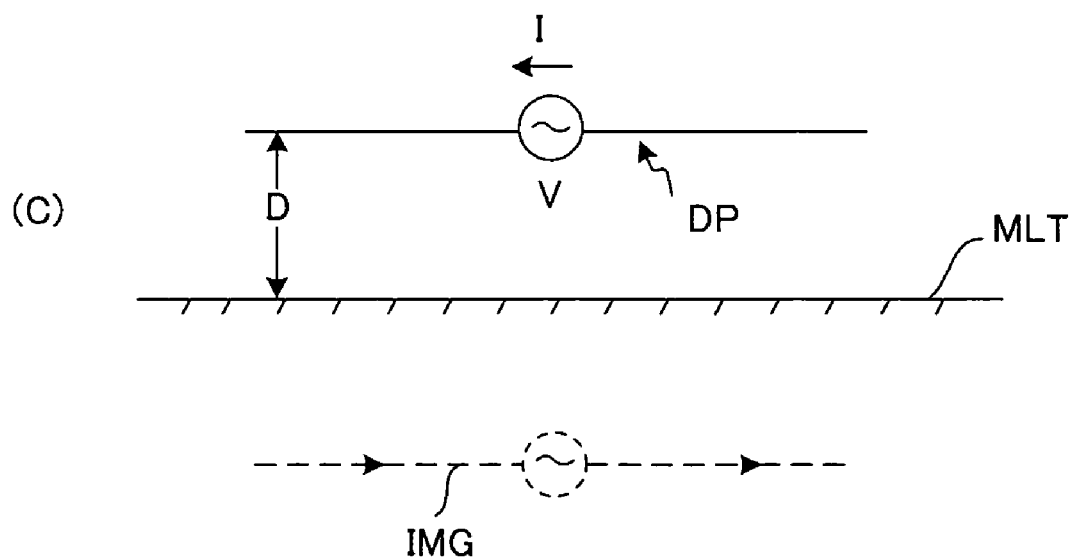
Figure 20:
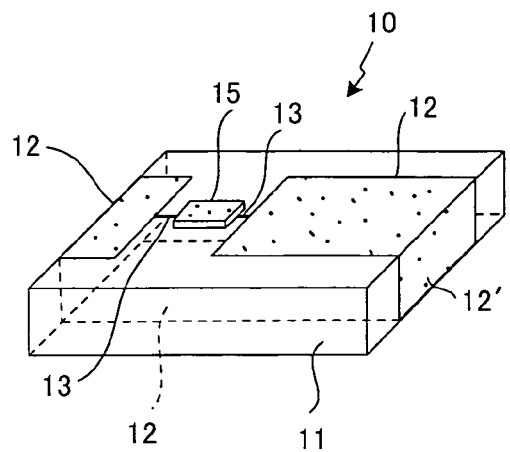
FIG. 20 is a perspective drawing of a prior RFID tag.
Figure 21:
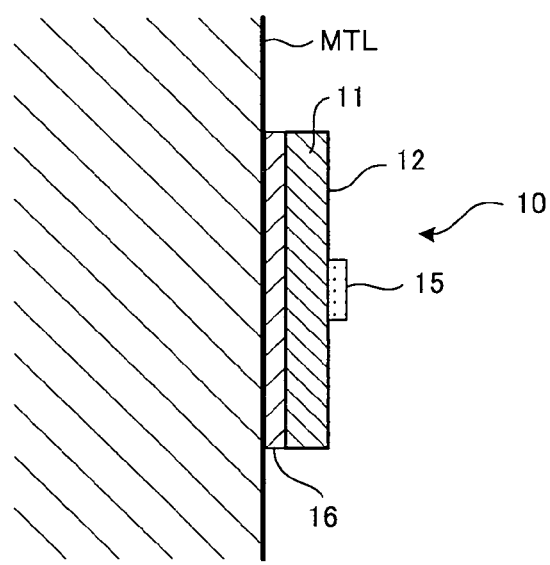
FIG. 21 is a drawing for explaining the attachment of the RFID tag of FIG. 20 to a conductive body.

FIG. 16 is a Smith chart showing the output impedance of the tag antenna of this second embodiment, where as shown by point A' at 950 MHz, output impedance was obtained that matches the input impedance of the LSI chip (see point B). Also, as shown FIG. 17, a constant −4 dB gain was obtained in the range 800 MHz to 1100 MHz.

According to the RFID tag of this second embodiment, together with being able to supply the necessary power even when attached to a non-conductive body, it is possible to transmit electromagnetic waves, as well as it is possible widen the bandwidth, thus it is possible to provide a small, thin RFID tag that does not require an impedance conversion circuit.

Also, it is possible to create the RFID tag of this second embodiment by layering an insulating sheet and conductive sheet on the bottom surface of the RFID tag of the first embodiment.

As many apparently widely different embodiments of the present invention can be made without departing from the spirit and scope thereof, it is to be understood that the invention is not limited to the specific embodiments thereof except as defined in the appended claims.

What is claimed is:

1. An RFID tag having a loop antenna and comprising:
a flat plate shaped dielectric member;
first and second loop antenna patterns that are formed on a first and second surface of said dielectric member so that they are separated from each other by a specified space on both said first and second surface, and so that each is continuous from the first surface to the second surface of the dielectric member; and
an IC chip that electrically connects said first and second loop antenna patterns on one of said surfaces.

2. The RFID tag of claim 1 wherein said first and second loop antenna patterns comprise IC chip-mounting sections on which said IC chip is mounted, and said IC chip-mounting sections are formed on said dielectric member so that they face each other and are separated from each other by a specified space.

3. An RFID tag having a loop antenna and comprising:
a flat plate shaped dielectric member;
an insulating film on which first and second band-shaped loop antennas comprising IC chip-mounting sections are formed so that the IC chip-mounting sections face each other and are separated from each other by a specified space; and
an IC chip that is mounted on said IC chip-mounting sections and is electrically connected to said first and second loop antennas;
wherein said insulating film on which said IC chip is mounted is wrapped around said dielectric member so that said IC chip is located on a first surface of said dielectric member, and said first and second loop antenna patterns are located on a second surface of said dielectric member so that they are separated from each other by a specified space.

4. The RFID tag of claim 1 or claim 3 wherein the surface opposite from said IC chip-mounting surface is attached to a conductive body by way of an insulating layer.

5. An RFID tag having a loop antenna and comprising:
a flat plate shaped dielectric member;
first and second loop antenna patterns that are formed on a first and second surface of said dielectric member so that they are separated from each other by a specified space on both said first and second surface, and so that each is continuous from the first surface to the second surface of the dielectric member;
an IC chip that electrically connects said first and second loop antenna patterns on one of said surfaces; and
an insulating layer and conductive layer that are layered on the surface opposite from said IC chip-mounting surface.

6. The RFID tag of claim 5 wherein said first and second loop antenna patterns comprise IC chip-mounting sections on which said IC chip is mounted, and said IC chip-mounting sections are formed on said dielectric member so that they face each other and are separated from each other by a specified space.

7. An RFID tag having a loop antenna and comprising:
a flat plate shaped dielectric member;
an insulating film on which first and second band-shaped loop antennas comprising IC chip-mounting sections are formed so that the IC chip-mounting sections face each other and are separated from each other by a specified space;
an IC chip that is mounted on said IC chip-mounting sections and is electrically connected to said first and second loop antennas; and
an insulating layer and conductive layer that are layered on the surface opposite from the IC chip mounting surface;
wherein said insulating film on which said IC chip is mounted is wrapped around said dielectric member so that said IC chip is located on a first surface of said dielectric member, and said first and second loop antenna patterns are located on a second surface of said dielectric member so that they are separated from each other by a specified space.

8. A method for manufacturing a RFID tag having a loop antenna comprising:
a step of forming first and second band-shaped loop antenna patterns that comprise IC chip-mounting sections on an insulating film so that the IC chip-mounting sections face each other and are separated from each other by a specified space;
a step of mounting an IC chip on said IC chip-mounting sections of said first and second loop antenna patterns, and electrically connecting said IC chip to said first and second loop antenna patterns; and
a step of wrapping and fastening said insulating film on which said IC chip is mounted around a flat plate shaped dielectric member so that said IC chip is located on a first surface of said dielectric member, and said first and second loop antenna patterns are located on a second surface of said dielectric member so that they are separated from each other by a specified space.

9. A method for manufacturing a RFID tag having a loop antenna comprising:
a step of forming first and second band-shaped loop patterns that comprise IC chip-mounting sections on an insulating film so that the IC chip-mounting sections face each other and are separated from each other by a specified space;
a step of mounting an IC chip on said IC chip-mounting sections of said first and second loop antenna patterns, and electrically connecting said IC chip to said first and second loop antenna patterns;

a step of wrapping and fastening said insulating film on which said IC chip is mounted around a flat plate shaped dielectric member so that said IC chip is located on a first surface of said dielectric member, and said first and second loop antenna patterns are located on a second surface of said dielectric member so that they are separated from each other by a specified space; and a step of layering an insulating layer and conductive layer on the surface opposite from said IC chip mounting surface.

* * * * *